Patented Dec. 10, 1935

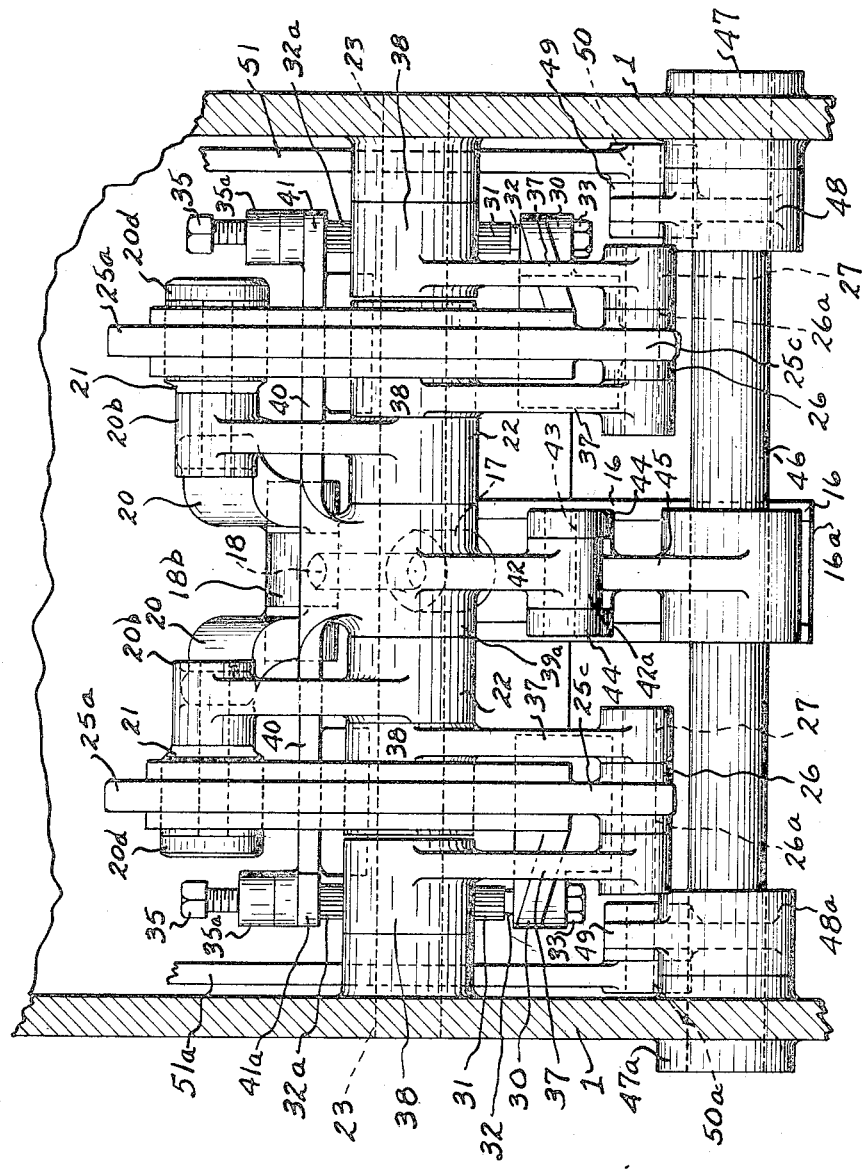

2,023,794

UNITED STATES PATENT OFFICE 2,023,794

CLAMP OPERATING APPARATUS

Charles Seybold, Oakwood, Ohio

Application March 18, 1933, Serial No. 661,595

19 Claims. (Cl. 164—51)

My invention relates to the type of apparatus used to operate clamps which hold stacks of material during a cutting operation on a power cutting machine.

Apparatus in use at the present time involves the use of friction created by means of brake drums or other known friction producing members. In adjusting this type of apparatus it is necessary to adjust it to a maximum resistance, and also to allow for slippage when the clamp is inhibited from further movement due to the complete compression of the stack of material being cut. This naturally subjects the elements comprising the apparatus to great strains. Because of these strains, the members are massive and must be machined with precision because inaccuracies in the frictional surfaces will cause undesired slippage of the clamp, which results in imperfect cutting. Another objectionable feature to friction controlled apparatus is the inability to compensate for changes which occur between long continued or spasmodic operation of the machine. Other apparatus has had spring means and lever means with separate supports on the machine.

It is an object of my invention to provide an apparatus which is not dependent upon friction or exteriorly supported springs to control the members operating and maintaining the pressure on a stack of materials to be cut.

Another object is to provide an especially compact and sturdy clamp mechanism which is dependent upon the reaction of a spring or springs carried in the mechanism, reacting only while the clamp is applying pressure to a stack of materials to be cut.

A further object is to provide a spring-controlled clamp apparatus which, by its compact, sturdy construction and absence of deflection, maintains a uniform pressure upon a stack of material being cut in such a manner that the clamp will exert continued sufficient pressure to overbalance the pressure applied to a stack by the knife while the knife is cutting, and thereby prevent inaccurate cutting.

A further object of my invention is to provide a power-operated clamp mechanism comprising a series of connected levers operable as a unit and rotatable about a common axis until opposition to the movement of the clamp becomes sufficient to react upon and deflect a spring, thereby causing some of the levers to become stationary while the remaining levers rotate about another axis in the system. Stated more generally, it is my object to provide a spring reaction clamp which will not come into play until it actually contacts with the work and starts to build up pressure.

A still further object of my invention is to provide a power-operated clamp mechanism comprising a series of spring-controlled levers which do not require precise machining, and thereby reduce the cost of manufacture.

These and other objects will be more specifically pointed out in the specifications and the drawings illustrating my device in its preferred form.

In the drawings:

Figure 3 is a rear elevation of the clamp-operating mechanism.

Figure 6 is a top plan of the spring-actuated lever.

Figure 7 is a side elevation of the spring-actuated lever.

Figure 8 is a top plan of the hook-shaped lever.

Figure 9 is a side elevation of the hook-shaped lever.

Figure 1:
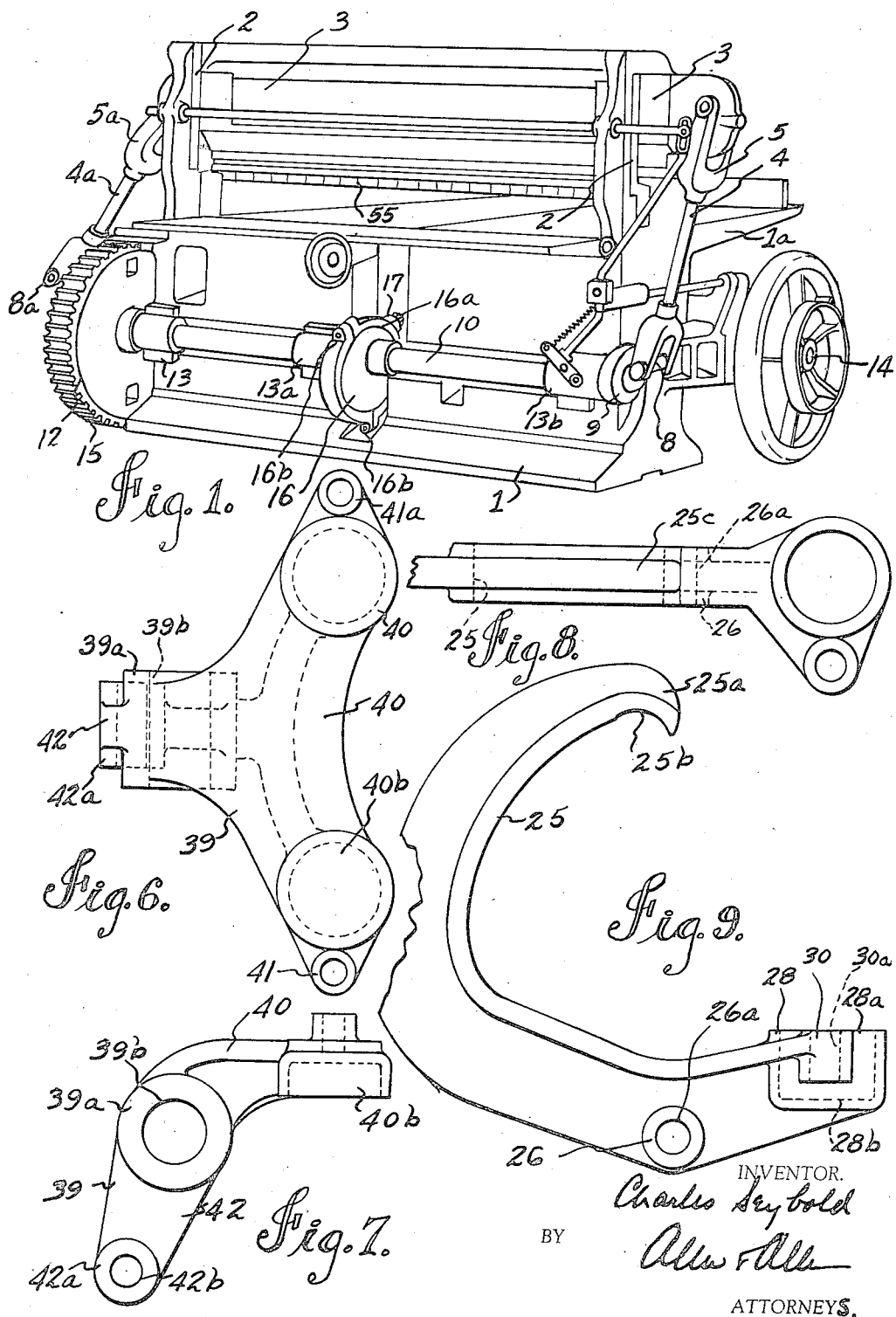
Figure 1 is a perspective of a cutting machine.

My device is adaptable to any type of a machine which requires a clamp for materials in stacks of varying heights. In the present instance, I have illustrated my device in conjunction with a power paper cutter having a main frame 1 supporting a cutting table 1a upon which the stacks of materials are placed.

Extending upwardly from the table are guideways 2 and 2a, in which is slidably mounted a cutter blade 3. The cutter blade ends are connected to pull rods 4 and 4a by means of clevises 5 and 5a. One of the pull rods 4 is connected through a clevis 8 at right angles to clevis 5 to a crank 9 which is fixedly mounted on a rotatable shaft 10. The other pull rod 4a is connected through a like clevis 8a to a pin (not shown) which is fixedly and eccentrically mounted in a bull wheel 12. This bull wheel is fixedly mounted on the rotatable shaft 10.

The shaft 10 is rotatably mounted in bearings 13, 13a, and 13b, which are fixed on the main frame of the cutting machine. It is driven by means of a belt-driven jack shaft 14 which is rotatably mounted in bearings provided on the main frame of the machine. The jack shaft extends across the rear of the machine and has the usual one revolution clutch (not shown) mounted on it. On this shaft is a pinion gear (not shown) which meshes with the gear teeth 15 on the bull wheel, which in turn drives the shaft 10 because it is fixed thereon as has been explained.

Fixedly mounted on and rotatable with the shaft 10 is an eccentric disc 16. Surrounding and rotatable about the disc is a yoke 16a made in two parts and clamped together by means of bolts 16b. While I have shown the eccentric mounted on the same shaft with the driving cranks for the cutter blade, it will readily occur to one skilled in the art that the disc and cutter blade could be mounted upon independent shafts to operate independently instead of being in timed relation. In any event, the arrangement must be such that the eccentric must operate sufficiently in advance of the cracks for purposes to be described.

Attached to the yoke and fixed within a threaded boss 17 is a pusher rod 18. This rod is adjusted and then held in place by a lock-nut 18a. An end 18b of the rod has an enlarged portion 19 with a hole 19a in which is mounted a connecting pin 19b. This pin connects the rod to two roller supporting levers.

Figure 2:
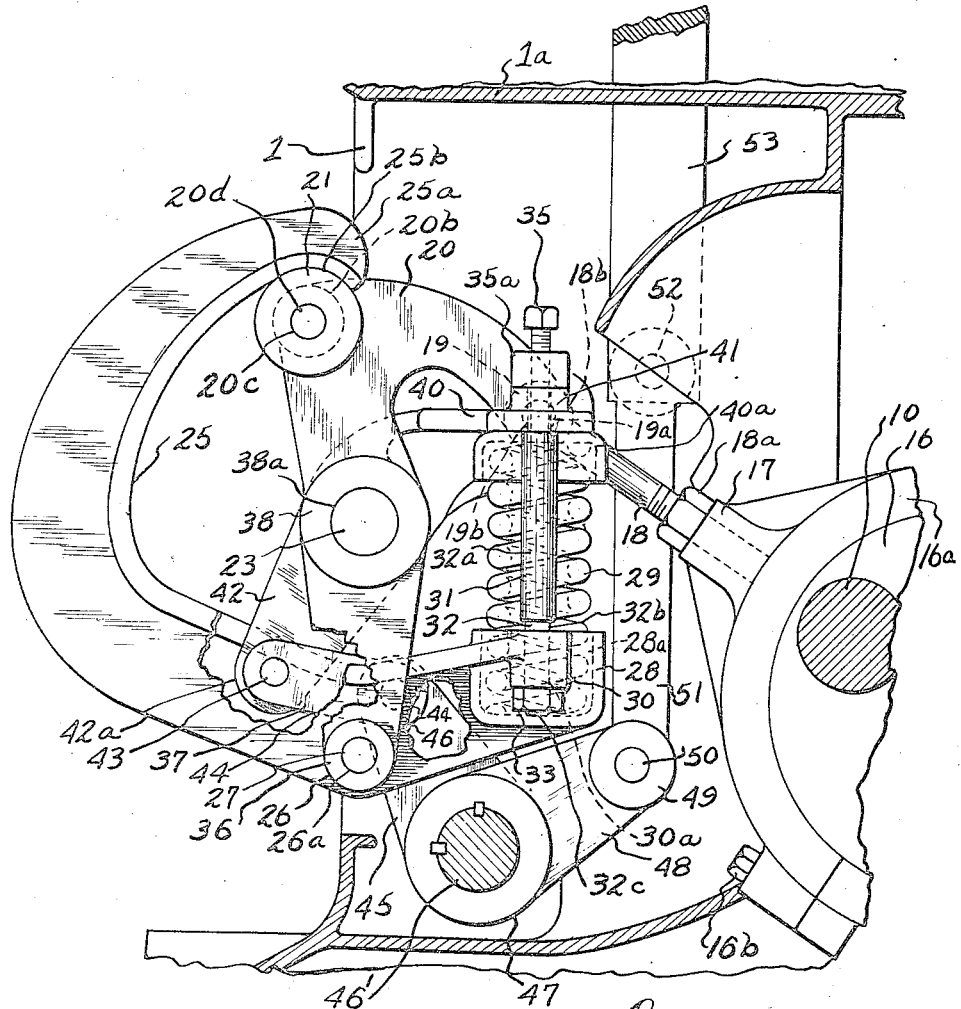
Figure 2 is a side elevation of the clamp-operating mechanism showing the respective parts in idle position.
Figure 4:
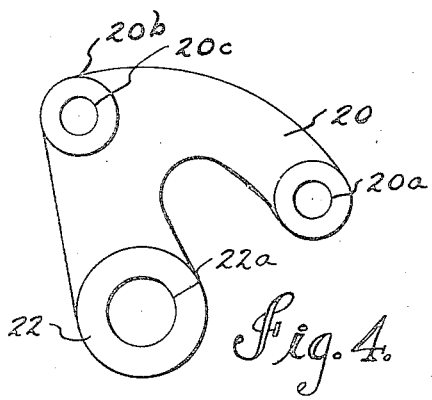
Figure 4 is a side elevation of the roller supporting lever.

Referring to Figures 4 and 2, it will be seen that the roller supporting levers are somewhat V-shaped. These levers have arms 20 in the ends of which are holes 20a for rotatably mounting the pin 19b therein. At the apex 20b is another hole 20c for fixedly mounting studs 20d. Upon the studs rollers 21 are rotatably mounted. The other ends of the roller supporting levers have bosses 22 with holes 22a for rotatably mounting the levers on a stationary shaft 23.

The stationary shaft 23 extends across to and is fixed in bearings on the main frame of the machine. This shaft is fixed so as to provide a common pivot about which my system of levers is free to rotate as a unit before any relative movement occurs between the various levers comprising my system, as will be explained.

I employ two hook-shaped levers, as illustrated in detail in Figures 8 and 9, having inner curved surfaces 25 over which the rollers 21 ride when the clamp pressure becomes equal to the reaction of the clamp springs, as will be described. At the terminus or upper ends 25, are concave grooves 25b into which the rollers latch and remain as long as there is no relative movement between the levers of the clamp, i. e., until the clamp has compressed a stack of material to a certain limit of compression, as will be described. In the lower horizontal portions 25c of the hook-shaped levers are bosses 26 with holes 26a. In the holes 26a studs 27 are rotatably mounted and provide a pivot for the hook levers to rotate about while the rollers are riding downwardly over the surfaces 25. At the extreme ends 28 of the horizontal portions of the levers are spring cups 28a in which the springs 29 are retained, so that they exert pressure against the bottoms 28b of the cups. Adjacent the spring pockets and integral therewith are bosses 30 with holes 30a in which are slidably mounted spacer rods 31 which extend alongside of the springs.

The spacer rods have a portion 32 which is smaller in diameter than the main body portion 32a. At the juncture of the portions 32 and 32a is a shoulder 32b which provides a stop to limit the amount of compression of the spring for any adjusted relation of the levers. The ends 32c of the rods are threaded and have nuts 33 screwed thereon which fix the length of movement of the spacer rods in the bosses 30. The upper ends 34 of the rods are tapped to receive screws 35 having nuts 35a.

The studs 27, constituting the pivots for the hook-shaped levers, are fixed in the ends 36 of links 37. The links 37 are in pairs (Fig. 3) and have upper bosses 38 which have holes 38a for rotatably mounting them on the stationary shaft 23. These arms are the main supports for the hook levers, thus providing the pivot for the hook lever to rotate about while the clamp is stalled, due to the resistance of a stack of material under pressure of the clamp.

Another lever 39, illustrated in detail in Figures 6 and 7, has a main boss 39a with a hole 39b for rotatably mounting it upon the stationary shaft 23. Extending upwardly from the boss, and when looked upon from the top, is a T-shaped section 40 having at its outermost extremities and integral therewith on each side, spring cups 40a and 40b for the springs 29. Bosses 41 and 41a for supporting the spacer rods are also fixed to these levers. Extending downwardly from the boss 39a is another arm 42 having a boss 42a with a hole 42b for a connecting pin 43. The lock-nuts 35a for the spacer rods engage the bosses 41 and 41a, and the adjustment of the nuts 35a on the screws 35 apply more or less compression to the springs, the screws 35 being set to lock the nuts 35a.

The connecting pin 43 has mounted on it two links 44 which connect the lever arm 42 to an arm 45 by means of pins 46 rotatably supported in the arms 45. The arm 45 is fixed on a rotatable shaft 46' and rotates it. This shaft 46' is rotatably mounted in bearings 47 and 47a which are provided on the side frames of the machine. Fixed on the shaft 46' are other levers 48 and 48a, having bosses 49 and 49a in which are fixed studs 50 and 50a for rotatably connecting them to vertically extending connecting rods 51 and 51a.

The connecting rods are rotatably mounted on studs 52 and 52a in their upper ends. The studs 52 and 52a are fixed in the lower ends of the vertically slidable clamp pull rods 53 and 53a. These pull rods are fixedly attached to the clamp 55 and are the connection between the clamp and my lever system.

*Operation*

After placing a stack of material in position for a cut, the operator steps on a foot treadle to set the bull wheel and shaft 10 into rotation. While the shaft is rotated the clamp and knife will both move down, the clamp being timed to be in advance of the knife so as to apply pressure and compress and hold the material before the knife begins to cut.

Figure 2A:
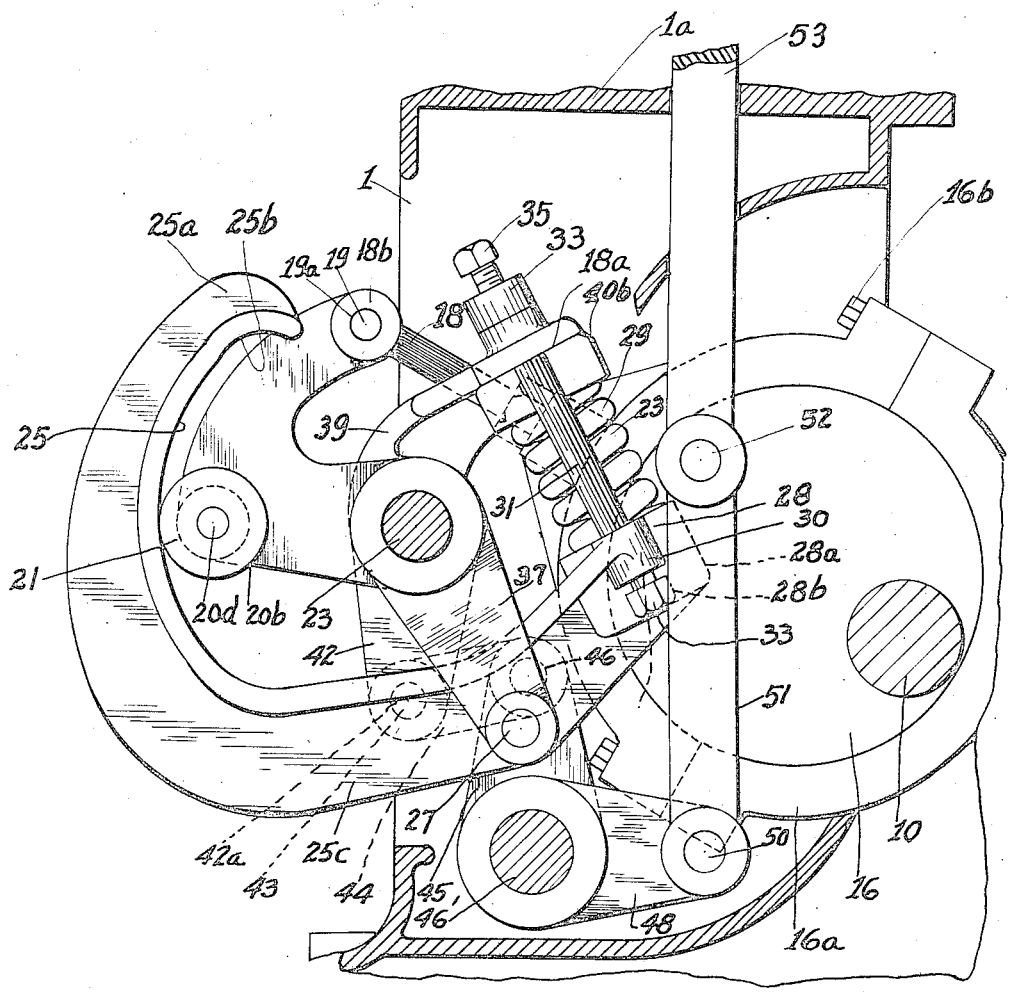
Figure 2a is a side elevation of the clamp-operating mechanisms showing the respective parts in position while applying the maximum pressure.
Figure 5:
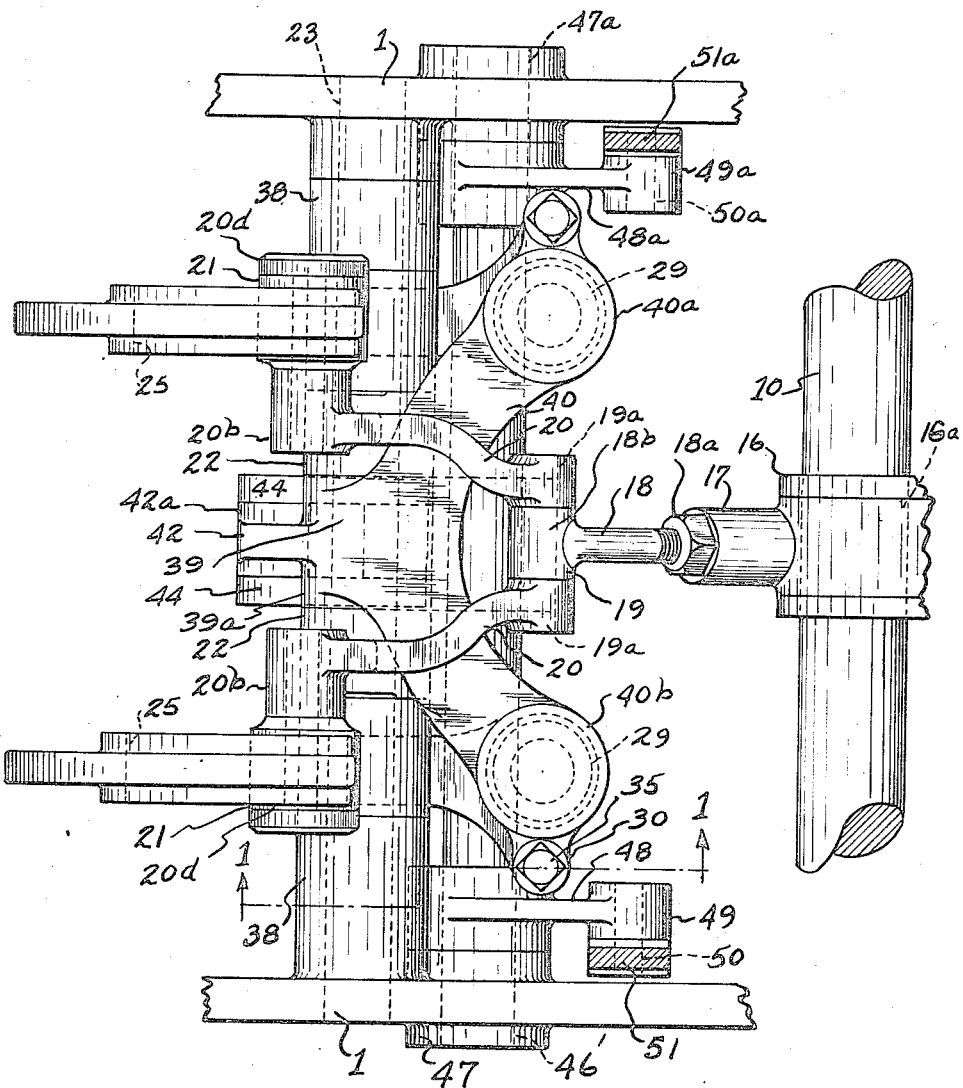
Figure 5 is a top plan of the clamp-operating mechanism.

In this case the eccentric is the prime mover for the clamp mechanism. When the eccentric begins to rotate the pusher rod 18 will move upwardly towards the left (see Fig. 2). While the pusher rod is moving towards the left, it will cause the roller supporting levers, the hook-shaped levers, arms 37, and the lever 39 to rotate about the stationary shaft 23; and through the medium of arm 42, links 44, arm 45, shaft 46, arms 48, will pull down the rods 51, thus lowering the clamp. There will be no relative movement between these levers at this time, because the spring is set to a certain pressure and holds the levers in fixed relation with each other and causes them to rotate about the shaft 23 as a unit. This free rotation about the shaft 23 continues until the clamp is brought into contact with a stack of material and compresses it. When the stack of material resists compression and this resistance becomes equivalent to the force of the spring, any further movement of the pusher rod will cause the spring to contract. The spring will contract because the lever 39, of which the arm 42 is a part, becomes stationary as soon as the clamp stops moving, due to the resistance of the compressed stack of material. When this happens, the roller supporting levers 20 and the lever 39 will be trying to rotate about the stationary shaft 23 and the hook-shaped levers about their pivots or studs 27 in the arms 37, to increase the clamping pressure by pushing upon springs 23. The rollers 21 will then start to ride over the surfaces of the hook-shaped levers. If a high stack of materials is being compressed, the rollers will move a considerable distance over the hook-shaped levers; and if a low stack is being compressed they will move only a short distance. They continue during this movement to exert rotative impulse to the system and their motion is resisted by the spring. The spring will compress until the shoulders on the spaced rods come into contact with the boss. This is a very short distance, but the surfaces 25 are almost a true arc on the center of the shaft 23. Thus, the full movement of the eccentric will result in compressing whatever size bundle of material is being acted upon, and the spring acts as a take-up opposing the compensating movement of the rollers 21. Figures 2a shows the position of parts just at the instant that clamping and cutting operation has been completed in a typical instance. At this time the clamp and cutter blade will be in a position to return to their starting position prior to another cut. The lever system will then assume the position shown in Figure 2, when the eccentric draws the roller supporting levers back to starting position.

Having thus described my invention, what I claim as new and novel and desire to secure by Letters Patent, is:

1. In combination with a clamp, transmission means to apply power to the clamp comprising a member to pull downwardly on the clamp, a compression spring, lever and spring connections whereby said downward pull is applied through a compression of said spring, said lever and spring connections being arranged to oscillate about a single axis as a unit without compression of said spring until the clamp has met with resistance of work to be clamped.

2. In combination with a clamp, transmission means to apply power to the clamp comprising a member to pull downwardly on the clamp, a compression spring, lever and spring connections whereby said downward pull is applied through a compression of said spring, said lever and spring connections being arranged to oscillate about a single axis as a unit without compression of said spring until the clamp has met with resistance of work to be clamped, said lever connections including a sliding connection, for the purpose described.

3. In a clamp, an axis shaft, a clamp operating lever mounted on said axis, another lever suspended from said axis on links, a spring connection between the two levers whereby one applies pivotal motion to the other, and a member for applying movement to the second lever, said member also located on said axis shaft.

4. In a clamp, an axis shaft, a clamp operating lever mounted on said axis, another lever suspended from said axis on links, a spring connection between the two levers whereby one applies pivotal motion to the other, and a member for applying movement to the second lever, said member also located on said axis shaft, said member having a sliding connection with said second lever.

5. Clamp mechanism comprising a slidable clamping means, lever means connected to and operating said clamping means, a shaft, a lever oscillatable about said shaft connected to said lever means operating said clamping means, link means rotatable about said shaft, a second lever means pivotally supported by said link means, reactionary means interspaced between said first lever on said shaft and said second lever means, pusher bar means rotatably supported on said shaft and slidably engaging the second lever means, and power means to oscillate said pusher bar means.

6. Clamp mechanism comprising a slidable clamping means, lever means connected to and operating said clamping means, a shaft, a lever oscillatable about said shaft connected to said lever means operating said clamping means, link means oscillatable about said shaft, a second lever means pivotally supported by said link means, reactionary means interspaced between said first lever on said shaft and said second lever means, pusher bar means rotatably supported on said shaft and slidably engaging the second lever means, and power means to oscillate said pusher bar means, said reactionary means comprising a spring strong enough to prevent relative movement between said first and second lever means until said slidable clamp is applying pressure.

7. Clamp mechanism comprising a slidable clamping means, lever means connected to and operating said clamping means, a shaft, a lever oscillatable about said shaft connected to said lever means operating said clamping means, link means oscillatable about said shaft, a second lever means pivotally supported by said link means, reactionary means interspaced between said first lever on said shaft and said second lever means, pusher bar means rotatably supported on said shaft and slidably engaging the second lever means, and power means to oscillate said pusher bar means, said pusher bar having a latched position with relation to said second lever means from which it is disengaged upon pivoting of said second lever means on the link means.

8. Clamp mechanism comprising a slidable clamping means, lever means connected to and operating said clamping means, a shaft, a lever oscillatable about said shaft connected to said lever means operating said clamping means, link means oscillatable about said shaft, a second lever means pivotally supported by said link means, reactionary means interspaced between said first lever on said shaft and said second lever means, pusher bar means rotatably supported on said shaft and slidably engaging the second lever means, and power means to oscillate said pusher bar means, said sliding engagement of the pusher bar being provided with the second lever means by roller means on one of the parts and a curved surface on the other over which the roller means rides.

9. Clamp mechanism comprising a slidable clamping means, lever means connected to and operating said clamping means, a shaft, a lever rotatable about said shaft connected to said lever means operating said clamping means, link means rotatable about said shaft, a second lever means pivotally supported by said link means, reactionary means interspaced between said first lever on said shaft and said second lever means, pusher bar means rotatably supported on said shaft and slidably engaging the second lever means, and power means to rotate said pusher bar means, said power operated means being limited to impart the same length of stroke to said pusher bar means for each operation of said clamp mechanism.

10. Mechanism operating a clamp comprising connections for operating said clamp, a shaft, a lever rotatable on said shaft engaging said connections for operating said clamp, links rotatable on said shaft, a pair of curved levers rotatably supported on said links, spring means interspaced between ends of said first levers and said curved levers, adjusting means supported on and controlling the spacing of the ends of said levers, pusher bar means rotatably supported on said shaft having rollers contacting with said curved levers, said pusher bar adapted to move with and relative to said curved levers, and sockets for the roller on said curved levers to inhibit the relative movement between the pusher bar and curved lever during the preliminary clamping operation before the compression of said spring occurs.

11. In mechanism for transmitting movement of a motive means to a clamp, a spring and members adapted to have a relative movement and wedging coaction incident to the relative movement and thereby to deform the spring, said members and spring being mounted to partake of the transmission movement as a unit until, when resistance to the clamp exceeds the resistance of the spring to deformation, said members assume said relative movement and wedging coaction.

12. Mechanism as set forth in claim 11, in which the members oscillate relatively when coacting, and one of said members has a surface inclined to the path of oscillation of the other member, against which said other member movably bears, for providing the wedging coaction.

13. Mechanism as set forth in claim 11 in which the members oscillate relatively when coacting, and one of which members is in the form of a lever with arms extended in diverse directions from its point of oscillation, one arm being operatively related to the spring and the other arm having an extension with a surface inclined to the path of oscillation of the other member, against which said other member movably bears, for providing the wedging coaction, the effective length for leverage of this other arm being greater than that of the one arm.

14. Mechanism as set forth in claim 11 in which the movement of the members as a unit is an oscillation about a certain point, and the movement of one of the members for the wedging coaction is an oscillation about said point.

15. Mechanism as set forth in claim 11 in which the members oscillate relatively about separate axes when coacting, and one of said members has a surface inclined to the path of oscillation of the other member, against which said other member movably bears, for providing the wedging coaction, the movement of the members as a unit being an oscillation about the axis of oscillation of said other member.

16. Mechanism as set forth in claim 11 in which the members oscillate relatively when coacting, about separate axes, and one of which members is in the form of a lever with arms extended in diverse directions from its axis of oscillation, one arm being operatively related to the spring and the other arm having an extension with a surface inclined to the path of oscillation of the other member, against which said other member movably bears, for providing the wedging coaction, the effective length for leverage of this other arm being greater than that of the one arm, and the movement of the members as a unit being an oscillation about the axis of said movably bearing other member.

17. A power-operated clamp comprising a clamp connection, a member connected thereto and oscillating about an axis, and a power transmitting system of levers having a reactive spring means interposed between and acting in series with the levers as a part of the transmission system, said system and clamp connection being formed to move about said axis as a unit up to the point of stoppage of the clamp connection.

18. In combination with a clamp, transmission means to apply power to the clamp comprising a spring reactive means forming an intermediate part of said transmission means and through which force is applied to the clamp, and a sliding connection forming an intermediate part of said transmission means for applying pressure to said spring reactive means.

19. In a power operated device for applying a clamp, a shaft, a spring actuated clamp applying element, a reducing system connected thereto, said reducing system including levers having a common axis with the applying element so that they can rotate as a unit to initially move the clamp, said reducing system also including a lost motion device arranged to be resisted by the spring of said element.

CHARLES SEYBOLD.